United States Patent
Yadava et al.

(10) Patent No.: US 8,655,959 B2
(45) Date of Patent: Feb. 18, 2014

(54) SYSTEM, METHOD, AND COMPUTER PROGRAM PRODUCT FOR PROVIDING A RATING OF AN ELECTRONIC MESSAGE

(75) Inventors: Amit Kumar Yadava, Bangalore (IN); Asheesh Dayal Mathur, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 238 days.

(21) Appl. No.: 11/968,983

(22) Filed: Jan. 3, 2008

(65) Prior Publication Data

US 2013/0246536 A1 Sep. 19, 2013

(51) Int. Cl.
*G06F 15/16* (2006.01)

(52) U.S. Cl.
USPC .......................................... 709/206; 709/205

(58) Field of Classification Search
USPC .......................................................... 709/206
See application file for complete search history.

(56) References Cited

U.S. PATENT DOCUMENTS

| | | | | |
|---|---|---|---|---|
| 5,436,780 | A | 7/1995 | Nagata et al. | 360/121 |
| 5,987,610 | A | 11/1999 | Franczek et al. | |
| 6,038,108 | A | 3/2000 | Dee et al. | 360/121 |
| 6,073,142 | A | 6/2000 | Geiger et al. | |
| 6,397,259 | B1 * | 5/2002 | Lincke et al. | 709/236 |
| 6,460,050 | B1 | 10/2002 | Pace et al. | |
| 7,003,055 | B2 * | 2/2006 | Sexton et al. | 375/341 |
| 7,051,077 | B2 * | 5/2006 | Lin | 709/207 |
| 7,113,977 | B1 * | 9/2006 | Baker et al. | 709/206 |
| 7,114,008 | B2 * | 9/2006 | Jungck et al. | 709/246 |
| 7,266,880 | B2 | 9/2007 | Biskeborn et al. | 29/603.15 |
| 7,287,060 | B1 * | 10/2007 | McCown et al. | 709/206 |
| 7,330,908 | B2 * | 2/2008 | Jungck | 709/246 |
| 7,444,403 | B1 * | 10/2008 | Packer et al. | 709/224 |
| 7,506,155 | B1 | 3/2009 | Stewart et al. | |
| 7,756,929 | B1 * | 7/2010 | Pettigrew et al. | 709/206 |
| 7,774,719 | B2 * | 8/2010 | Taylor | 715/838 |
| 7,797,443 | B1 * | 9/2010 | Pettigrew et al. | 709/232 |
| 7,805,683 | B2 * | 9/2010 | Sattler et al. | 715/769 |
| 2002/0174185 | A1 * | 11/2002 | Rawat et al. | 709/206 |
| 2004/0019643 | A1 * | 1/2004 | Zirnstein, Jr. | 709/206 |
| 2004/0034663 | A1 * | 2/2004 | Noguchi | 707/104.1 |
| 2004/0133561 | A1 * | 7/2004 | Burke | 707/3 |
| 2004/0202299 | A1 * | 10/2004 | Schwartz | 379/142.01 |
| 2005/0050146 | A1 * | 3/2005 | Jani et al. | 709/206 |
| 2005/0060643 | A1 * | 3/2005 | Glass et al. | 715/501.1 |
| 2005/0081059 | A1 * | 4/2005 | Bandini et al. | 713/201 |
| 2005/0102205 | A1 * | 5/2005 | Yamamoto et al. | 705/34 |
| 2005/0108344 | A1 * | 5/2005 | Tafoya et al. | 709/206 |
| 2005/0131888 | A1 * | 6/2005 | Tafoya et al. | 707/3 |

(Continued)

FOREIGN PATENT DOCUMENTS

WO WO2006131744 * 12/2006
WO 2007070323 * 6/2007

OTHER PUBLICATIONS

"McAfee SpamKiller USer Guide" Jul. 2005, McAfee, pp. 1-53, http://download.mcafee.com/products/manuals/en-us/MSK_UserGuide_2006.pdf.*

(Continued)

*Primary Examiner* — Ninos Donabed
(74) *Attorney, Agent, or Firm* — Patent Capital Group

(57) ABSTRACT

A system, method, and computer program product are included for providing a rating of an electronic message to a recipient. In use, an electronic message intended for a recipient is rated. Additionally, the rating and die electronic message are provided to the recipient.

17 Claims, 5 Drawing Sheets

(56) References Cited

U.S. PATENT DOCUMENTS

| | | | |
|---|---|---|---|
| 2006/0029038 A1* | 2/2006 | Jungck | 370/351 |
| 2006/0031334 A1* | 2/2006 | Kim | 709/206 |
| 2006/0200531 A1* | 9/2006 | Tokuda et al. | 709/206 |
| 2006/0253458 A1 | 11/2006 | Dixon et al. | 707/10 |
| 2006/0253578 A1 | 11/2006 | Dixon et al. | 709/225 |
| 2006/0253579 A1 | 11/2006 | Dixon et al. | 709/225 |
| 2006/0253580 A1 | 11/2006 | Dixon et al. | 709/225 |
| 2006/0253581 A1 | 11/2006 | Dixon et al. | 709/225 |
| 2006/0253582 A1 | 11/2006 | Dixon et al. | 709/225 |
| 2006/0253583 A1 | 11/2006 | Dixon et al. | 709/225 |
| 2006/0253584 A1 | 11/2006 | Dixon et al. | 709/225 |
| 2007/0005702 A1* | 1/2007 | Tokuda et al. | 709/206 |
| 2007/0005716 A1 | 1/2007 | LeVasseur et al. | 709/206 |
| 2007/0043813 A1* | 2/2007 | Pickup | 709/206 |
| 2007/0156415 A1* | 7/2007 | Foth et al. | 705/1 |
| 2007/0214220 A1* | 9/2007 | Alsop et al. | 709/206 |
| 2007/0299916 A1* | 12/2007 | Bates et al. | 709/206 |
| 2008/0016579 A1* | 1/2008 | Pang | 726/26 |
| 2008/0109448 A1* | 5/2008 | Aboel-Nil et al. | 707/10 |
| 2008/0133682 A1* | 6/2008 | Chadwick et al. | 709/206 |
| 2009/0222922 A1* | 9/2009 | Sidiroglou et al. | 726/23 |

OTHER PUBLICATIONS

Sidiroglou, "Systems, Methods, and Media protecting a digital processing device from attack", Feb. 22, 2007, Wipo 2007022454, All.*

"Email Reputation Services: Stops Email Threats Before the Gateway," Trend Micro Incorporated, 2007.

"McAfee SiteAdvisor: McAfee System and Messaging Protection," McAfee, Inc., copyright 2003-2008.

* cited by examiner

SYSTEM, METHOD, AND COMPUTER PROGRAM PRODUCT FOR PROVIDING A RATING OF AN ELECTRONIC MESSAGE

FIELD OF THE INVENTION

The present invention relates to processing electronic messages, and more particularly to rating electronic messages.

BACKGROUND

The communication of electronic messages has become commonplace. In addition, security systems have traditionally been utilized for preventing, blocking, etc. unwanted electronic messages (e.g. malicious, unsolicited, etc.). However, traditional security systems have customarily exhibited various limitations, particularly with respect to providing an electronic message recipient information about the electronic message.

For example, recipients of unwanted electronic messages have generally been uninformed of the nature of such electronic messages. Thus, a recipient may not be aware that opening an electronic message may result in one or more undesired situations. In another example, a recipient may be unable to verify the authenticity and/or validity of a received electronic message. As a result, the recipient may be exposed to unfortunate consequences associated with opening the unwanted electronic message.

There is thus a need for addressing these and/or other issues associated with the prior art.

SUMMARY

A system, method, and computer program product are included for providing a rating of an electronic message to a recipient. In use, an electronic message intended for a recipient is rated. Additionally, the rating and the electronic message are provided to the recipient.

DETAILED DESCRIPTION

Figure 1:
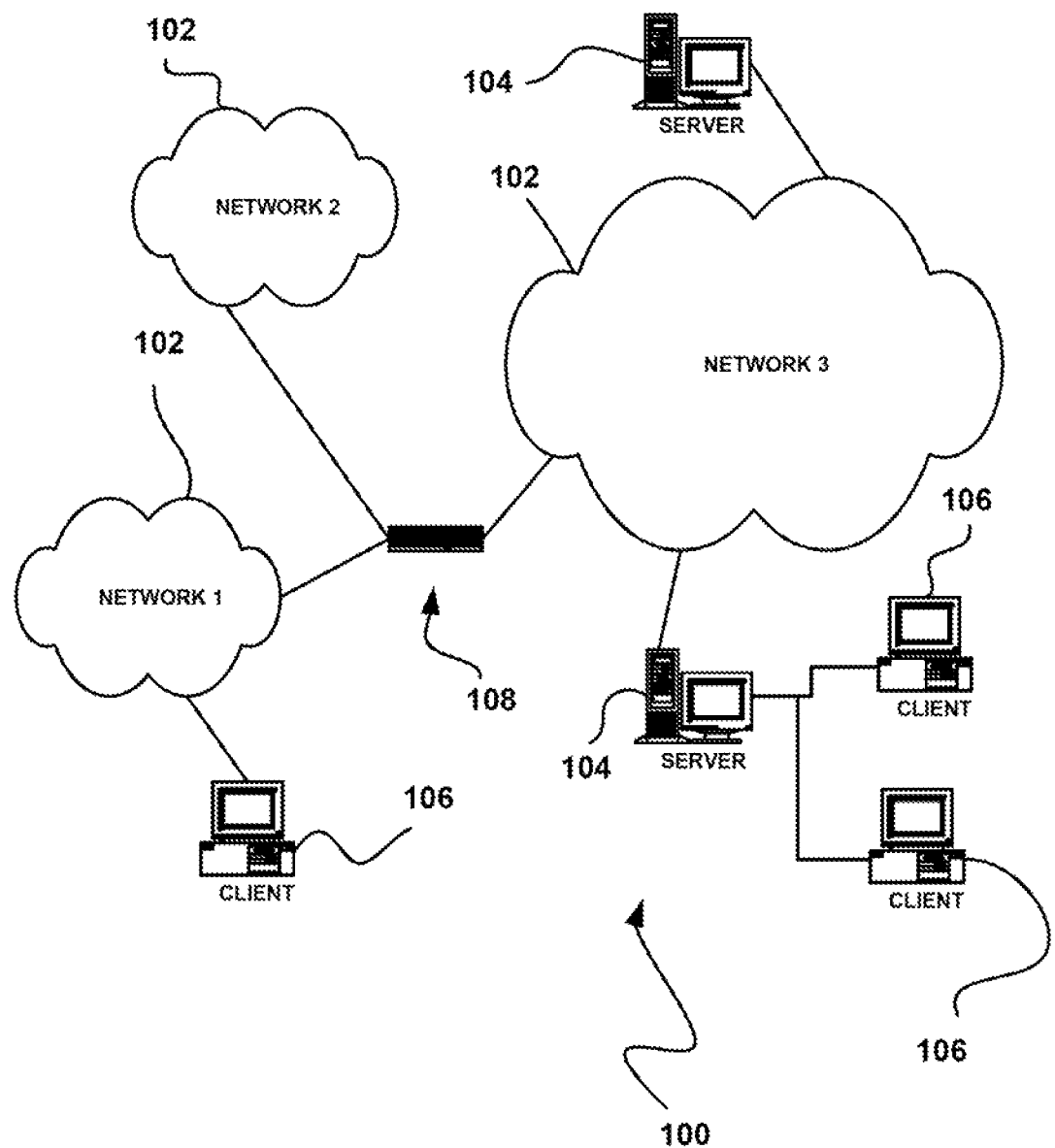
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
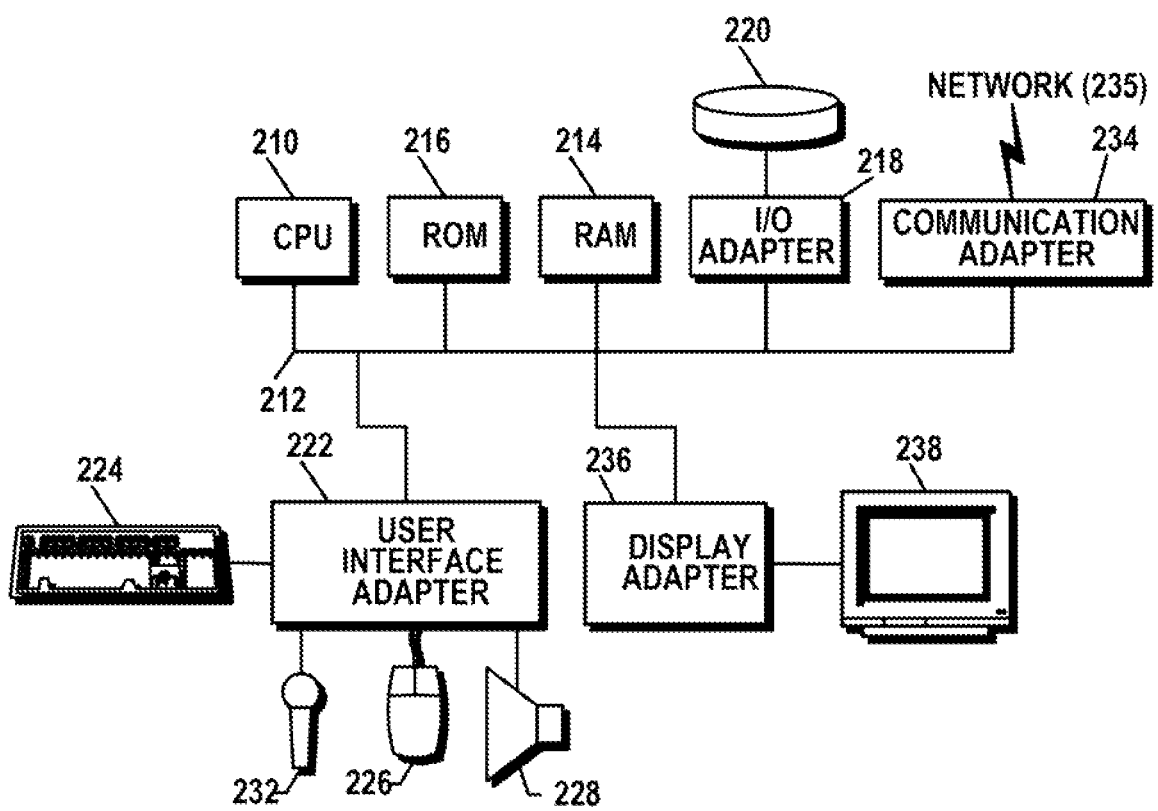
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
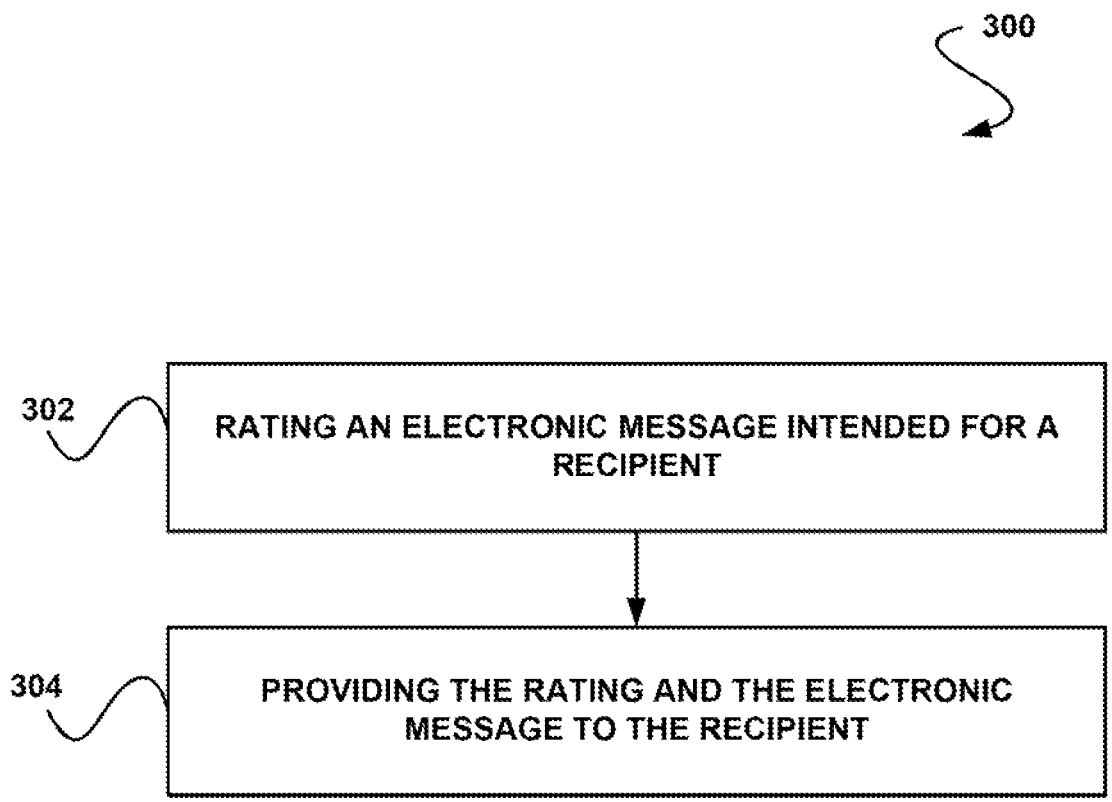
FIG. 3 shows a method for providing a rating of an electronic message and the electronic message to a recipient, in accordance with one embodiment.

FIG. 3 shows a method 300 for providing a rating of an electronic message and the electronic message to a recipient, in accordance with one embodiment. As an option, the method 300 may be carried out in the context of the architecture and environment of FIGS. 1 and/or 2. Of course, however, the method 300 may be carried out in any desired environment.

As shown in operation 302, an electronic message intended for a recipient is rated. In various embodiments, the electronic message may include an electronic mail message, text message, short message service (SMS) message, etc. Of course, however, the electronic message may include any other message capable of being communicated electronically.

Additionally, the recipient for which the electronic message is intended may be any device capable of receiving the electronic message, such as any of the devices described above with respect to FIGS. 1 and/or 2. In one embodiment, the recipient may include an electronic mail message client. In another embodiment, the recipient may include a web based client. For example, the recipient may include a web based electronic mad message client. Optionally, the recipient may have an electronic message application (e.g. electronic mail message application, etc.) installed thereon for receiving electronic messages, and optionally sending electronic message.

Moreover, the electronic message may be rated in any desired manner. In one embodiment, one or more portions of the electronic message (e.g. a body, attachment, header, subject, etc. of the electronic message) may be processed. For example, the processing may include performing a scan, behavioral analysis, etc. of any of such portions of the electronic message for identifying predetermined data (e.g. known unwanted data, known unsolicited data, keywords, etc.).

As another option, the portions of the electronic message may be processed in a virtual environment (e.g. utilizing a virtual machine). Just by way of example, an attachment of the electronic message may be opened within the virtual environment. In this way, results of opening the electronic message or any portion of such electronic message (e.g. unwanted results, etc.) may be identified within the virtual environment, such that the results may be analyzed (e.g. via a behavioral analysis, via a comparison with a fingerprint of known unwanted data, etc.).

Thus, as an option, the electronic message may be rated based on processing of such electronic mail message. Just by way of example, if the processing indicates that results of opening the electronic message are unwanted (e.g. via the behavior analysis etc.), the electronic message may be rated with a rating that indicates such unwanted results. As another example, if the processing indicates that a portion of the electronic message includes predetermined data, the rating of the electronic message may indicate that the electronic message includes such predetermined data.

In another embodiment, a fingerprint for one or more portions of the electronic message may be determined. In yet another embodiment, the fingerprint may be compared with a plurality of predetermined fingerprints (e.g. fingerprints of known unwanted data, fingerprints of known unsolicited data, etc.) stored in a database. In still another embodiment, the electronic message may be rated only if a match is found between the fingerprint and at any of the predetermined fingerprints stored in the database.

As an option, the rating may reflect the matched predetermined fingerprint. For example, each predetermined fingerprint stored in the database may be associated with a particular rating. To this end, the electronic message may optionally be rated with the particular rating associated with a predetermined fingerprint that matches the fingerprint of the electronic message.

Still yet, the rating may reflect the content of the electronic message. For example, the rating may indicate whether the electronic message includes unwanted data (e.g. virus, Trojan, phishing, worm etc.), unsolicited data, unknown data, etc. Such indication may be provided via a numerical scale, as an option. Just by way of example, the rating may include a number within the numerical scale for indicating a probability of whether the electronic message includes unwanted data, a risk (e.g. of unwanted activity, etc.) associated with content of the electronic message, etc.

Additionally, the rating may be based on various categories. Just by way of example, the rating may include a categorization of the electronic message. As another example, the rating may include a categorization (e.g. severity) of a risk associated with the electronic message (e.g. a risk of unwanted results associated with opening the electronic message, etc.), such as critical, warning, information, unknown, etc.

Further, in operation 304, the rating and the electronic message are provided to the recipient. The electronic message may be provided to the recipient in any manner. For example, the electronic message may be transmitted to the recipient (e.g. over a network, etc.). In another embodiment, the electronic message may be provided to the recipient via an electronic message application installed on the recipient, such that the recipient may access (e.g. open, etc.), the electronic message.

In addition, the rating may also be provided to the recipient in any desired manner. For example, the rating may be transmitted with the electronic message to the recipient. Of course, however, the rating may also be transmitted to the recipient separately from the electronic message.

In one embodiment, providing the rating to the recipient may include displaying an image indicating the rating in association with the electronic message on a graphical user interface (GUI). For example, the rating may include an icon displayed adjacent to the subject of the electronic message, a link to the electronic message, etc. Optionally, the rating and electronic message may be provided to the recipient utilizing the electronic message application installed on the recipient.

In another embodiment, providing the rating to the recipient may include displaying the rating in a window when a cursor is placed (e.g. by a user) over the link to the electronic message. In still another embodiment, the rating may be provided when the electronic message is selected and prior to opening the electronic message. For example, providing the rating to the recipient may include displaying another electronic message containing the rating in a window when the electronic message is selected. It should be noted that the window in which the rating is displayed may optionally be separate from a window in which a selectable link to the electronic message is displayed, for example.

In this way, a user of the recipient may determine whether to access the electronic message based on the rating. For example, providing a rating which indicates that the electronic message includes unwanted data, unsolicited data, unknown data, etc. to the recipient may allow the user of the recipient to be informed of the nature of the electronic message. Thus, the user may accordingly avoid opening the electronic message, delete the electronic message, initiate an application for cleaning the electronic message, etc. Of course, in other embodiments, providing a rating which indicates that the electronic message includes only informative data, non-malicious data, etc. may inform the user that the electronic message may be opened without risk of an unwanted result.

Figure 4:
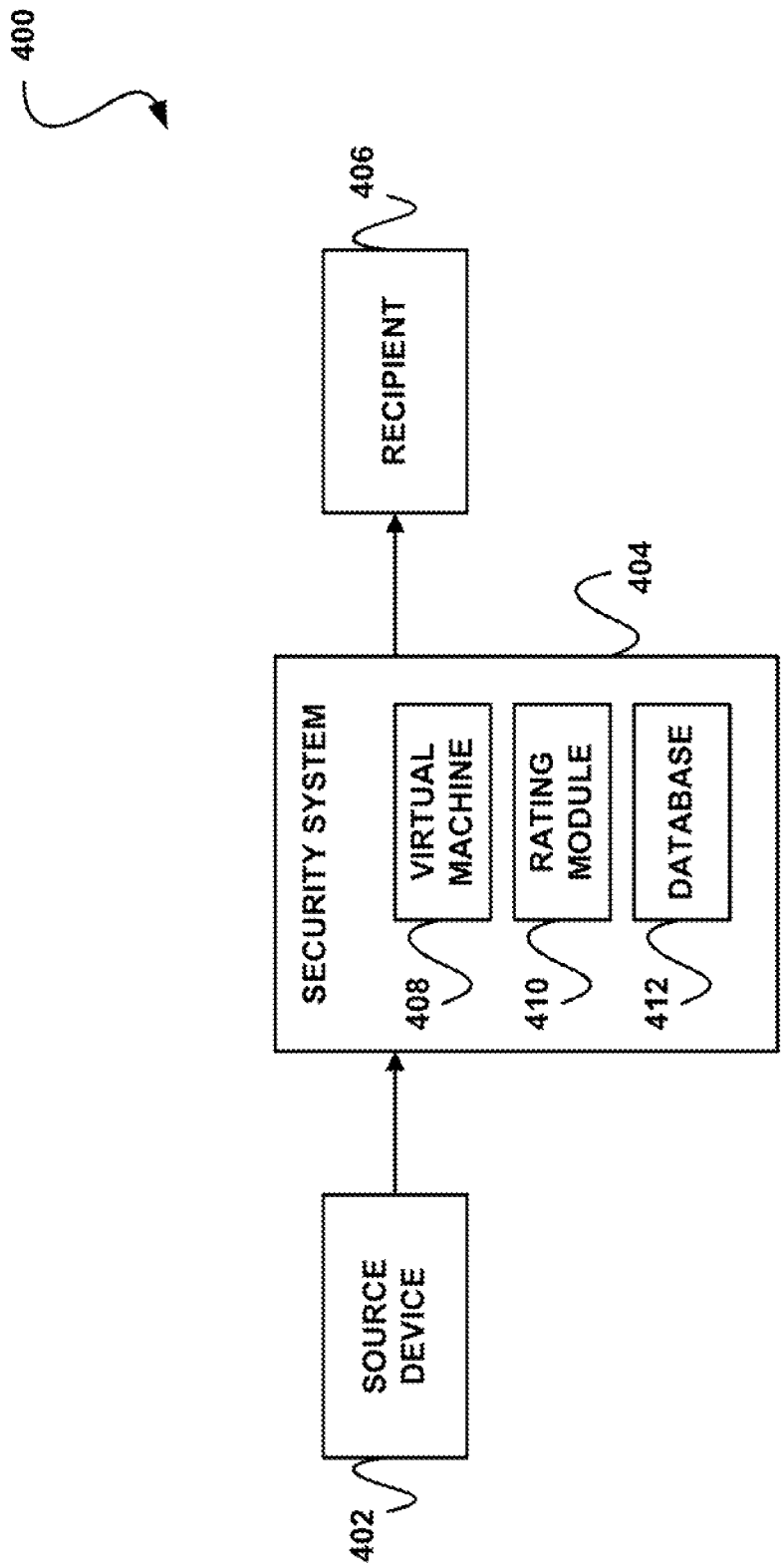
FIG. 4 illustrates a system for providing a rating of an electronic message and the electronic message to a recipient, in accordance with another embodiment.

FIG. 4 illustrates a system 400 for providing a rating of an electronic message and the electronic message to a recipient, in accordance with still yet another embodiment. As an option, the system 400 may be implemented in the context of the architecture and environment of FIGS. 1-3. Of course, however, the system 400 may be implemented in any desired environment. Yet again, it should be noted that the aforementioned definitions may apply during the present description.

As shown, a source device 402 is in communication with a security system 404 (e.g. via a network, etc.). In the context of the present embodiment, the source device 402 may include any source of an electronic message. As an option, the source device 402 may include any of the servers 104 and/or clients 106 illustrated in FIG. 1.

In one embodiment, the source device 402 may create the electronic message. For example, the source device 402 may include an application for creating electronic messages (e.g. such as an electronic mail message application, etc.). Further, the created electronic message may be sent from the source device 402 (e.g. over the network, etc.). In another embodiment, the source device 402 may receive the electronic message (e.g. from another device, etc.) and forward the electronic message (e.g. over the network etc.).

In yet another embodiment, a security system 404 may intercept the electronic message during communication of the electronic message from the source device 402. Just by way of example, the electronic message may be destined for a recipient device 406. Of course, however, the source device 402 may send the electronic message to the security system 404 in any manner. Thus, the security system 404 may receive the electronic message from the source device 402. In the context of the present embodiment, the security system 404 may include any device (e.g. such as any of servers 104 and/or clients 106 illustrated in FIG. 1.) capable of receiving electronic messages. For example, the security system 404 may include a network gateway, an electronic mail message server, etc.

As shown, the security system 404 includes a virtual machine 408. The virtual machine 408 may include any virtual implementation of a machine on which data may be stored and/or run. In one embodiment, the virtual machine 408 may be located in a secure portion of the security system 404. Of course, while the virtual machine 408 is shown as a component of the security system 404, the virtual machine 408 may also be located on a centralized device (not shown) in communication with the security system 404 (e.g. via a network, etc.).

Further, the security system 404 includes a rating module 410. The rating module 410 may include any module capable of rating the electronic message. Further still, the security system 404 includes a database 412. In one embodiment, the database 412 may be integrated with the security system 404. In still another embodiment, the database 412 may be located on a centralized device and may be in communication with the security system 404 (e.g. via a network, etc.).

In another embodiment, the database 412 may include one or more fingerprints (e.g. of known unwanted data, known unsolicited data, known wanted data, etc.). In another embodiment, the database 412 may include one or more uniform resource locators (URLs) of known phishing sites. In still another embodiment, the database 412 may include one or more known harmful macro-instructions. Of course, however, the database 412 may include any predetermined data capable of being used in the rating of the electronic message.

In response to the receipt of the electronic message, the security system 404 may rate the electronic message. As an option, the security system 404 may compare data identified from within the electronic message with the data stored in the database 412. In one embodiment, if a match is found between at least a portion of the electronic message and predetermined data stored in the database 412, the electronic message may be rated according to a rating assigned to such predetermined data.

For example, a fingerprint may be generated for one or more portions of the electronic message and may be compared against one or more predetermined fingerprints stored in the database 412. Additionally, the results of the comparison against the database 412 may be used by the rating module 410 to rate the electronic message. Optionally, the rating module 410 may apply a rating to the electronic message based on a rating associated with the matching predetermined fingerprint.

In another example, the electronic message may be processed and any attachments, hyperlinks, macro-programs, or other portions of the electronic message may be run in the virtual machine 408 to generate one or more results. Additionally, the results may be compared against the database 412.

In yet another embodiment, a fingerprint may be generated for the results and may be compared against one or more fingerprints in the database 412. Additionally, a result of the comparison may be used by the rating module 410 to rate the electronic message.

In still yet another embodiment, the security system 404 may include an application that runs in the background of a system. For example, the security system 404 may continuously identify received electronic messages (e.g. stored in a queue of the security system 404, etc.) and may rate such electronic messages.

In another embodiment, the rating module 410 may rate the electronic message based on a strength of (e.g. an amount of similarity with) one or more matching predetermined fingerprints in the database 412. In yet another embodiment, the rating module 410 may rate the electronic message based on a number of matching predetermined fingerprints in the database 412. In still another embodiment, the rating module 410 may rate the electronic message based on whether a match is found in the database 412. Of course, however, the rating module 410 may rate the electronic message in any manner.

In another embodiment, the rating module 410 may assign the rating to the electronic message. In one example, the rating module 410 may insert the rating in a header of the electronic message. In yet another example, the rating module 410 may insert the rating in a subject field of the electronic message. In still another example, the rating module 410 may attach the rating to the electronic message (e.g. as a data structure, etc.).

In addition, the security system 404 is in communication with the recipient device 406 (e.g. via a network, etc.). In one embodiment, the recipient device 406 may receive the electronic message from the security system 404. For example, the electronic message may be received by the security system 404 from the source device 402, and may be forwarded from the security system 404 to the recipient device 406.

To this end, the security system 404 may provide the electronic message and the rating of the electronic message to the recipient device 406. The recipient device 406 may include any of the servers 104 and/or clients 106 illustrated in FIG. 1. In addition, the recipient device 406 may include an electronic message application capable of receiving the rating and the electronic message and presenting such rating and electronic message to a user of the recipient device 406. Thus, a user of the recipient device 406 may be informed of the rating and determine whether to access the electronic message based on the rating.

Figure 5:
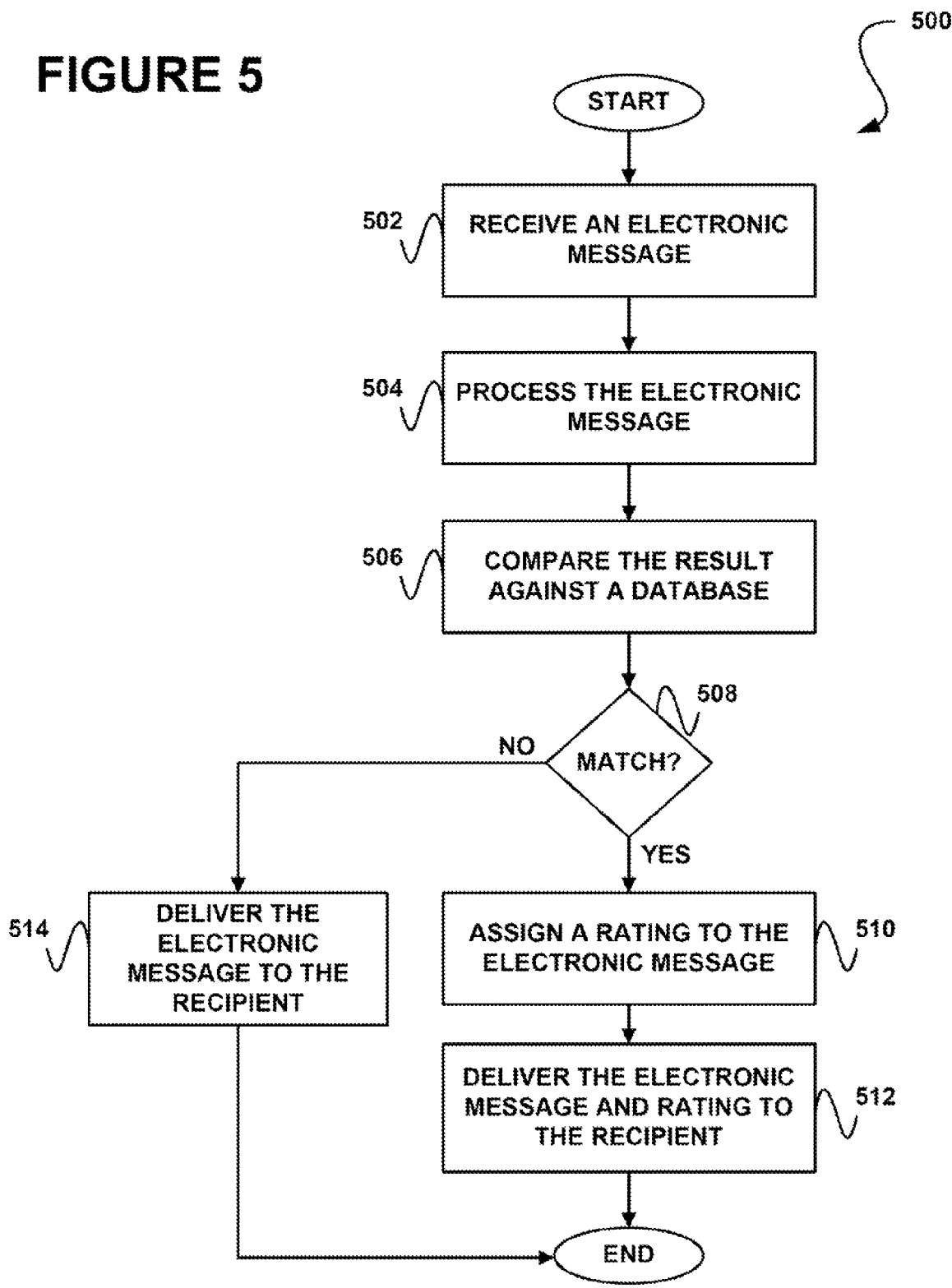
FIG. 5 shows a method for delivering an electronic message and conditionally a rating of the electronic message to a recipient, in accordance with still yet another embodiment.

FIG. 5 shows a method 500 for delivering an electronic message and conditionally a rating of the electronic message to a recipient, in accordance with another embodiment. As an option, the method 500 may be carried out in the context of the architecture and environment of FIGS. 1-4. Of course, however, the method 500 may be carried out in any desired environment. It should also be noted that the aforementioned definitions may apply during the present description.

As shown in operation 502, an electronic message is received. In one embodiment, the electronic message may be received from a source of the electronic message. Optionally, such source may include a device (e.g. such as any of the devices described above with respect to FIGS. 1 and/or 2) that initiated communication of the electronic message. Just by way of example, the electronic message may be received from the source device 402 of FIG. 4.

Additionally, the electronic message may be received by a security system (e.g. the security system 404 of FIG. 4). For example, the electronic message may be intercepted by the security system. Just by way of example, the security system may intercept the electronic message during communication of the electronic message from the source. In one embodiment, the security system may be located on a network over which the electronic message is communicated. Of course, however, the electronic message may be received in any manner.

Further, in operation 504, the electronic message is processed. In one embodiment, one or more portions of the electronic message may be processed. For example, any attachments of the electronic message may be opened and scanned. In another example, a message body of the electronic message may be scanned for one or more keywords. In still another example, one or more hyperlinks in the electronic message may be selected such that content associated with such hyperlinks may be analyzed.

Additionally, in another example, one or more macro-instructions in the electronic message may be run. In yet another example, a subject of the electronic message may be examined. In still another example, a header of the electronic message may be examined.

In another embodiment, the electronic message may be processed in a virtual machine. For example, the hyperlinks in the electronic message may be selected within the virtual machine. In another example, if it is determined that the electronic message contains one or more attachments, the attachments may be opened within the virtual machine.

In yet another embodiment, a fingerprint may be generated for one or more portions of the electronic message. For example, one or more portions of the message body of the electronic message may be fingerprinted. In another example, the header of the electronic message may be fingerprinted. In still another embodiment, the results of the processing of one or more portions of the electronic message may be fingerprinted. For example, the output of the execution of the attachments of the electronic message may be fingerprinted.

Further still, in operation 506, the results of the processing are compared with predetermined data stored in a database. In one embodiment, the database may include one or more known fingerprints of unwanted electronic messages. For example, the database may include fingerprints of known viruses, harmful macro-instructions, links to malicious and/or phishing sites, etc.

In addition, in decision 508, it is determined whether the processed electronic message matches any predetermined data stored in the database. In response to a determination in decision 508 that no matches are found in the database, the electronic message is delivered to the intended recipient of the electronic message. See operation 514. Thus, in one embodiment, the electronic message may be delivered to an electronic mail message client. Optionally, the intended recipient may include the recipient device 406 of FIG. 4.

Furthermore, in response to a determination in decision 508 that one or more matches are found in the database, in operation 510 a rating is assigned to the electronic message. In one embodiment, the rating assigned to the electronic message may be based on the results of the matching. For example, the rating assigned to the electronic message may be based on the amount of data in the electronic message that matches data stored in the database. For example, a greater amount of data in the electronic message for which a match has been identified may result in the electronic message being rated as a more severe risk than if a lesser amount of data in the electronic message matches predetermined data stored in the database.

In another embodiment, the rating of the electronic message may be based on the severity of a risk posed by any matches between one or more portions of the electronic message and predetermined data stored in the database. For example, an electronic message containing an attachment that matches a virus fingerprint in the database may be ranked higher than another electronic message which contains a link that matches a phishing link in the database.

In still another embodiment, the rating may be within a predetermined scale. For example, the rating of the electronic message may be identified within a numerical scale. In another embodiment, the rating of the electronic message may be identified within an alphabetical scale. Of course, however, the rating of the electronic message may be performed on any scale capable of conveying a ranking.

In yet another embodiment, the rating of the electronic message may include a categorization. For example, the electronic message rating may include a "critical" categorization if the message contains one or more known viruses, hyperlinks to phishing sites, or any other data that is known to cause harm to the recipient.

In another example, the electronic message rating may include a "warning" categorization if the message contains abnormal or suspicions data that may potentially harm the recipient (e.g. based on a behavioral analysis), but does not contain data matching data stored in the database that is known to be harmful.

In yet another example, the electronic message rating may include an "unknown" categorization if the electronic message lacks sufficient data to be categorized with any other categorization, but another analysis (e.g. a heuristic analysis, etc.) results in an indication of behavior that may possibly be harmful to the recipient.

In still another example, the electronic message rating may include an "information" categorization if the electronic message contains known valuable information (e.g. confidential information, etc.). Of course, however, the rating of the electronic message may be categorized in any manner.

Further still, in operation 512, the electronic message and the rating are delivered to the recipient. In one embodiment, one or more additional electronic messages (e.g. pop-up message, etc.) may be provided to the recipient based on the rating and/or categorization. For example, if the recipient selects an electronic message with an "information" categorization, an electronic message may appear to the recipient which includes the rating in addition to describing the information (e.g. confidential information, etc.) contained within the electronic message.

In another example, a message containing a warning may appear to the recipient in a window if the recipient selects an electronic message with a "warning" categorization and prior to opening of the electronic message. In this way, the recipient may be informed as to the nature of the electronic message and may decide whether to access the electronic message based on the rating.

In another embodiment, an automatic response may be initiated if the electronic message is assigned a predetermined rating. For example, if the electronic message rating includes a "critical" categorization, an additional warning may be given to the recipient before the electronic message can be accessed. In another example, if an electronic message rating includes a "critical" categorization, the electronic message may be automatically deleted, and an Internet service provider (ISP) of a sender of the electronic message may be contacted.

In still another embodiment, at least part of the electronic message may be sent to the database, based on the rating assigned to the electronic message. For example, the content of the electronic message may be sent to the database if the rating of the electronic message is categorized as "critical." In another embodiment, at least part of the electronic message may be fingerprinted before being stored in the database.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving an electronic message intended for a recipient;
processing the electronic message;
determining a fingerprint for one or more portions of the electronic message;
comparing the fingerprint with a plurality of predetermined fingerprints that are stored in a database and that are associated with known unwanted data, known unsolicited data, a plurality of uniform resource locators (URLs), and a plurality of known harmful macro-instructions to be executed on a computer, wherein each of the plurality of predetermined fingerprints is assigned a predetermined rating within a predetermined scale indicative of a severity of risk of accessing electronic message content,
wherein the severity of risk indicated by the predetermined rating assigned to each of the plurality of predetermined fingerprints is based upon whether the predetermined fingerprint is associated with known unwanted data, known unsolicited data, a URL, or a known harmful macro-instruction; and
providing a rating for the electronic message if the fingerprint matches at least one of the plurality of predetermined fingerprints, the rating being based upon the predetermined rating assigned to the matching at least one predetermined fingerprint, wherein the rating is provided in conjunction with an icon that indicates whether the electronic message includes the unwanted data, and wherein a different icon is provided to indicate a presence of non-malicious data in the electronic message;
wherein the processing of the electronic message is performed in a virtual environment that includes utilizing a virtual machine, opening an attachment of the electronic message in the virtual environment, identifying results of the opening of the attachment within the virtual environment, and analyzing the results of the opening via a behavioral analysis; and
wherein a predetermined rating assigned to a predetermined fingerprint associated with a known harmful macro-instruction indicates a greater severity of risk than a predetermined rating assigned to a predetermined fingerprint associated with a URL.

2. The method as set forth in claim 1, wherein providing the rating to the recipient includes displaying an icon adjacent to a link to the electronic message.

3. The method as set forth in claim 1, wherein providing the rating to the recipient includes displaying the rating in a window when a cursor is placed over a link to the electronic message.

4. The method as set forth in claim 1, wherein providing the rating to the recipient includes displaying another electronic message containing the rating in a window when the electronic message is selected and prior to opening the electronic message.

5. The method as set forth in claim 1, further comprising scanning an attachment of the electronic message.

6. The method as set forth in claim 5, wherein the electronic message is rated based on the scanning of the attachment.

7. The method as set forth in claim 1, further comprising scanning a message body of the electronic message for one or more keywords.

8. The method as set forth in claim 7, wherein the electronic message is rated based on identification of the one or more keywords in the message body of the electronic message.

9. The method as set forth in claim 1, wherein the rating includes a categorization.

10. The method as set forth in claim 1, wherein one or more additional electronic messages are provided to the recipient based on the rating.

11. The method as set forth in claim 1, wherein an automatic response is initiated if the rating includes a predetermined rating.

12. The method as set forth in claim 1, wherein at least part of the electronic message is sent to the database, based on the rating.

13. The method as set forth in claim 1, wherein the electronic message is rated with a particular rating associated with the at least one of the predetermined fingerprints stored in the database that matches the fingerprint for the one or more portions of the electronic message.

14. The method as set forth in claim 1, wherein the determining of the fingerprint for the one or more portions of the electronic message includes determining a fingerprint for a header of the electronic message.

15. A computer program product embodied on a tangible non-transitory computer readable medium for performing operations on a computer, the operations comprising:
receiving an electronic message intended for a recipient;
processing the electronic message;
determining a fingerprint for one or more portions of the electronic message;
comparing the fingerprint with a plurality of predetermined fingerprints that are stored in a database and that are associated with known unwanted data, known unsolicited data, a plurality of uniform resource locators (URLs), and a plurality of known harmful macro-instructions to be executed on a particular computer, wherein each of the plurality of predetermined fingerprints is assigned a predetermined rating within a predetermined scale indicative of a severity of risk of accessing electronic message content, wherein the severity of risk indicated by the predetermined rating assigned to each of the plurality of predetermined fingerprints is based upon whether the predetermined fingerprint is associated with known unwanted data, known unsolicited data, a URL, or a known harmful macro-instruction; and
providing a rating for the electronic message if the fingerprint matches at least one of the plurality of predetermined fingerprints, the rating being based upon the predetermined rating assigned to the matching at least one predetermined fingerprint, wherein the rating is provided in conjunction with an icon that indicates whether the electronic message includes unwanted data, and wherein a different icon is provided to indicate a presence of non-malicious data in the electronic message;
wherein the processing of the electronic message is performed in a virtual environment that includes utilizing a virtual machine, opening an attachment of the electronic message in the virtual environment, identifying results of the opening of the attachment within the virtual environment, and analyzing the results of the opening via a behavioral analysis; and
wherein a predetermined rating assigned to a predetermined fingerprint associated with a known harmful macro-instruction indicates a greater severity of risk than a predetermined rating assigned to a predetermined fingerprint associated with a URL.

16. A system, comprising:

a processor; and a memory coupled to the processor, wherein the system is configured for:

receiving an electronic message intended for a recipient;

processing the electronic message by the processor;

determining a fingerprint for one or more portions of the electronic message;

comparing the fingerprint with a plurality of predetermined fingerprints that are stored in a database and that are associated with known unwanted data, known unsolicited data, a plurality of uniform resource locators (URLs), and a plurality of known harmful macro-instructions to be executed on a computer, wherein each of the plurality of predetermined fingerprints is assigned a predetermined rating within a predetermined scale indicative of a severity of risk of accessing electronic message content, wherein the severity of risk indicated by the predetermined rating assigned to each of the plurality of predetermined fingerprints is based upon whether the predetermined fingerprint is associated with known unwanted data, known unsolicited data, a URL, or a known harmful macro-instruction, and providing a rating for the electronic message if the fingerprint matches at least one of the plurality of predetermined fingerprints, the rating being based upon the predetermined rating assigned to the matching at least one predetermined fingerprint, wherein the rating is provided in conjunction with an icon that indicates whether the electronic message includes unwanted data, and wherein a different icon is provided to indicate a presence of non-malicious data in the electronic message;

wherein the processing of the electronic message is performed in a virtual environment that includes utilizing a virtual machine, opening an attachment of the electronic message in the virtual environment, identifying results of the opening of the attachment within the virtual environment, and analyzing the results of the opening via a behavioral analysis; and wherein a predetermined rating assigned to a predetermined fingerprint associated with a known harmful macro-instruction indicates a greater severity of risk than a predetermined rating assigned to a predetermined fingerprint associated with a URL.

17. The system as set forth in claim 16, further comprising memory coupled to the processor via a bus.

* * * * *

UNITED STATES PATENT AND TRADEMARK OFFICE
CERTIFICATE OF CORRECTION

PATENT NO. : 8,655,959 B2
APPLICATION NO. : 11/968983
DATED : February 18, 2014
INVENTOR(S) : Amit Kumar Yadava et al.

It is certified that error appears in the above-identified patent and that said Letters Patent is hereby corrected as shown below:

On the Title page, in item (57), in column 2, line 4, delete "die" and insert -- the --, therefor.

Signed and Sealed this
Tenth Day of June, 2014

Michelle K. Lee
*Deputy Director of the United States Patent and Trademark Office*